United States Patent [19]

Blaschek

[11] Patent Number: 4,816,857

[45] Date of Patent: Mar. 28, 1989

[54] INTERCHANGEABLE LENS FOR MOVIE CAMERA WITH A SOUND DAMPENING SYSTEM

[75] Inventor: Otto Blaschek, Dornach, Fed. Rep. of Germany

[73] Assignee: Arnold & Richter Cine Technik GmbH & Co. Betriebs KG, Munich, Fed. Rep. of Germany

[21] Appl. No.: 100,763

[22] Filed: Sep. 24, 1987

[30] Foreign Application Priority Data

May 7, 1987 [EP]   European Pat. Off. ............ 87890090

[51] Int. Cl.⁴ .................. G03B 17/10; G03B 31/00
[52] U.S. Cl. ................................. 354/286; 352/35
[58] Field of Search ............................ 354/286; 352/35

[56] References Cited

U.S. PATENT DOCUMENTS

| | | | |
|---|---|---|---|
| 3,331,653 | 7/1967 | Blascheck et al. | 352/35 |
| 3,659,932 | 5/1972 | Bach | 352/35 |
| 4,013,352 | 3/1977 | Monroy | 352/35 |
| 4,515,469 | 5/1985 | Blaschek | 352/35 |
| 4,577,944 | 3/1986 | Grosser et al. | 352/35 |

FOREIGN PATENT DOCUMENTS

| | | |
|---|---|---|
| 0144933 | 11/1984 | European Pat. Off. . |
| 1236239 | 2/1964 | Fed. Rep. of Germany . |
| 3538827 | 6/1986 | Fed. Rep. of Germany . |
| 2086071 | 10/1980 | United Kingdom . |

Primary Examiner—A. A. Mathews
Attorney, Agent, or Firm—Cushman, Darby & Cushman

[57] ABSTRACT

Interchangeable lens for a movie camera having a bayonet ring or a threaded ring for releasable attachment thereto, the outside mount (41) of the interchangeable lens (4) itself being designed as a blimp.

5 Claims, 4 Drawing Sheets

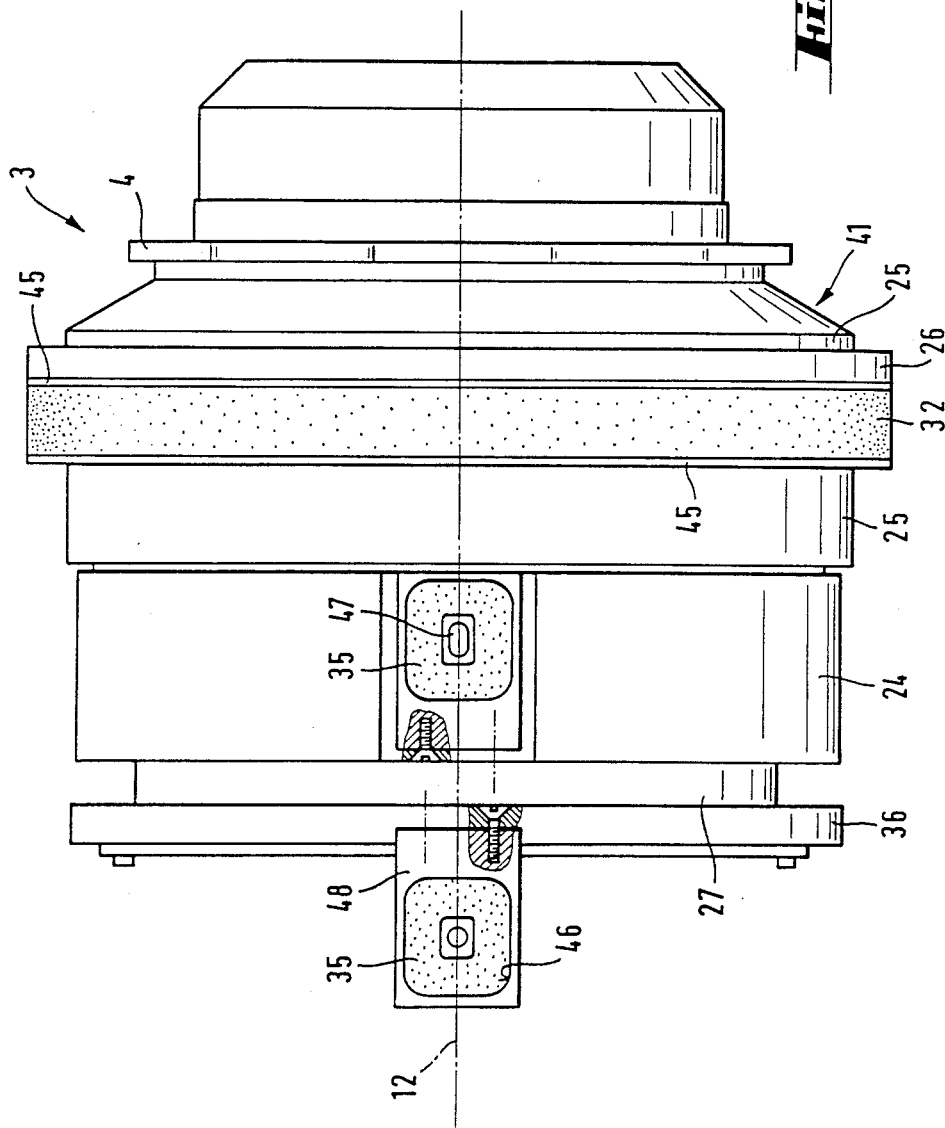

INTERCHANGEABLE LENS FOR MOVIE CAMERA WITH A SOUND DAMPENING SYSTEM

BACKGROUND OF THE INVENTION

1. The Field of the Art

The invention relates to an interchangeable lens for a movie camera having a bayonet ring or a threaded ring for releasable attachment thereto.

2. Description of the Prior Art

West German Specification No. 1 236 329 teaches an interchangeable lens of this type, in which the lens is provided with a blimp which encloses a lens and is intended to obstruct the passage of interfering noises emanating from the camera drive to the outside. Due to the fact that, in addition to the interchangeable lens, a blimp is also provided for the lens, and an unwieldly design results. Also, the quick-connect operation of the lens is rendered difficult, since always two fastening operations have to be carried out, namely, one for fastening the interchangeable lens with mount to the camera, and one for fastening the blimp. Furthermore, the design and size of the blimp must be adjusted to the design and size of the lens being used.

Therefore, the object of the invention is to provide an interchangeable lens of the type described in the introduction featuring improved sound insulation without interfering with the quick-connect operation.

SUMMARY OF THE INVENTION

According to the invention, this object is achieved by designing the outside mount of the interchangeable lens itself as a soundproof enclosure. By thusly designing the interchangeable lens, one can in very simple fashion—while avoiding additional, expensive blimps that require elaborate fastening procedures—construct the outside mount itself as a soundproof enclosure. Thus, the interchangeable lens incorporating the invention is a compact, quick-connect unit.

Because of the advantageous elastic quick-connect termination of the sleeve to the flange or the bayonet ring, an unobstructed quick-connect operation can be carried out that is comparable to conventional interchangeable lenses without sound attenuation. Because of the insertion of a damping ring, any sound propagation from the camera case is reduced.

With the arrangement of the drive pin connected to the focusing scale ring or diaphragm scale ring and penetrating the sleeve and elastic damping elements, sound propagation to the drive pin, and thereby to the outer surface of the lens, is reduced as much as possible in these areas as well.

Therefore, the design embodying the invention results in an interchangeable lens with optimum sound-deadening characteristics and which is in no way impaired in its operations.

Another preferred embodiment of the invention lies in the fact that the terminal area of the sleeve facing away from the camera case is connected to an anti-reflection protection system having a frustoconical lateral surface and the tapered terminal area of which adjoining the lens case is connected to a flat glass plate extending perpendicularly to the lens axis. With this type of anti-reflection protection system attached to the blimp, the sound in the terminal area of the outside mount and of the lens case facing away from the camera case can also be insulated as much as possible. In this connection, it is also of great advantage that there be no contact between the soundproof outside mount with anti-reflection protection system on one side and the lens case without soundproof enclosure on the other.

Additional noise insulation can be achieved in the camera direction to be rated very critically if, in a modification of the invention, one proceeds in such a way that the flat glass plate, by means of a ring-shaped sound-absorbing damping element, is inserted into the anti-reflection protection system and/or that the anti-reflection protection system at its end on the end face of the lens is designed with a ring-shaped, sound-absorbing damping element extending preferably over its entire radial width.

According to another advantageous modification of the invention, provision is made that the diaphragm driving means designed as a diaphragm driving ring is connected to two diametrically opposed carrier elements running parallel to the lens axis, each with a ring-shaped opening to locate the damping element. As a result of this design, an adequate mechanical rotary connection is possible with a minimum of sound-exposed mass between the drive pins or diaphragm scale rings and diaphragm driving means.

According to another preferred modification of the invention, the drive pin connected to the focusing scale ring can also be placed with its radial inner end in a slotted opening of the damping element connected to the focusing aid and extending in the direction of the lens axis. With such an opening which extends in the direction of the lens axis, an unobstructed relative movement of the lens case in the direction of its axis for the focusing is possible, if there is contact between drive pin and damping element for a backlash-free transmission of the rotary motion.

The camera drive connected to the lens carrier can also has a radially extending bar which moves toward the camera interior, a sound-absorbing damping element of elastic material being arranged between this bar and a plate connected to the camera case, and the damping element preferably being connected to the bar by screwed connections. In this advantageous manner, sound propagation from the sound-exposed bar within the case to the housing exterior is reliably and effectively damped. In this instance, the camera movement forms with the interchangeable lens a rigid unit for producing a quick and rigid coupling. Since the camera movement itself is only connected to the camera case by a damping element, any sound propagation is prevented despite the rigid coupling. A particular advantage is the fact that the sound-exposed bar of the camera drive comes to lie inside the camera case, thereby ruling out with assurance any sound propagation through the bar to the outer surface of the case.

BRIEF DESCRIPTION OF THE DRAWINGS

In the following section, the invention will be described in detail, reference being had to the embodiments shown in the drawing, in which:

FIG. 3 is a top view of the interchangeable lens of the invention, without sleeve.

DETAILED DESCRIPTION OF THE PREFERRED EMBODIMENT

Figure 1:
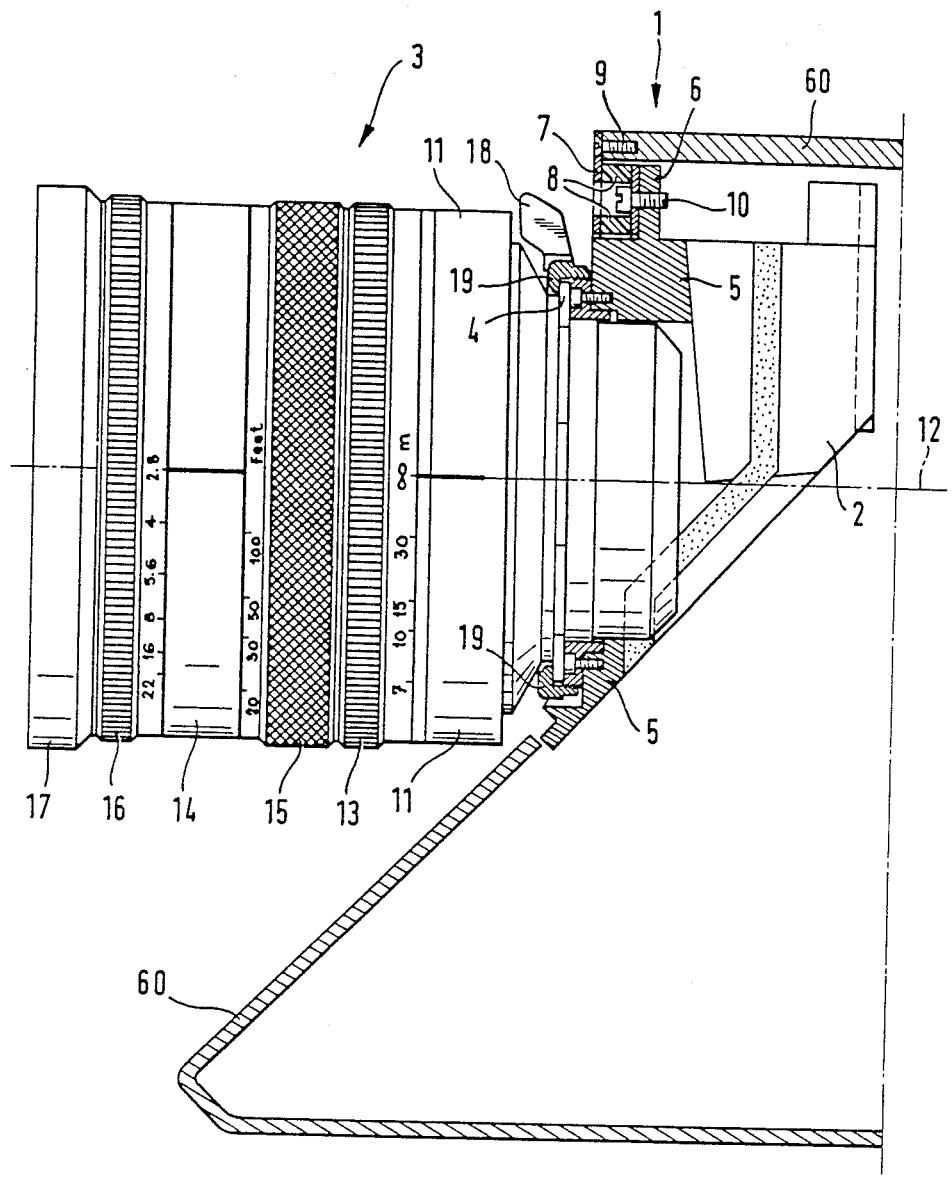
FIG. 1 is a side elevation of the interchangeable lens incorporating the invention, showing a portion of the camera case.

A movie camera 1, only partially visible in Figure 1, comprises a camera drive 2 and an interchangeable lens 3. By means of a bayonet ring 4 releasably secured to the interchangeable lens, the latter is connected to a lens carrier 5 attached to a camera drive 2. The camera drive 2 has on its top side and on its two vertical sides a bar 6 displaced towards the camera case 60. The camera drive 2 and the camera case 60 is connected to the camera case 60 in such a way that a damping element 8 of sound-absorbing material, e.g., rubber, is arranged between a carrier plate 7 and the bar 6. The carrier plate 7 is releasably secured to the camera case 60 by screwed connections 9. The damping element 8 is attached to the bar 6 of the camera drive 2 by screwed connections 10, but it could also be bonded thereto. This type of attachment of the camera drive 2 to the camera case 60 is similar to the attachment as taught by Unexamined West German Application 304 1 161. However, this attachment has the disadvantage that the sound is transmitted without damping through the connecting plate to the outer surface of the camera.

The interchangeable lens 3 has on its outer surface a focusing scale ring 13 with appropriate distance markings joined to the index ring 11 and pivoting about the lens axis 12. Between this focusing ring 13 and another index ring 14 there is provided a grip ring 15 with which the interchangeable lens 3 is held during the quick-change operation. A diaphragm scale ring 16 associated with the index ring 14 is connected to the diaphragm with devices to be described in detail in the following section and pivots about the longitudinal axis of the lens. A frontal lens barrel 17 is located in the free terminal area of the interchangeable lens 3. A bayonet ring 19 with a grip 18 is also provided on the side of the camera for attachment of the interchangeable lens 3.

Figure 2A:
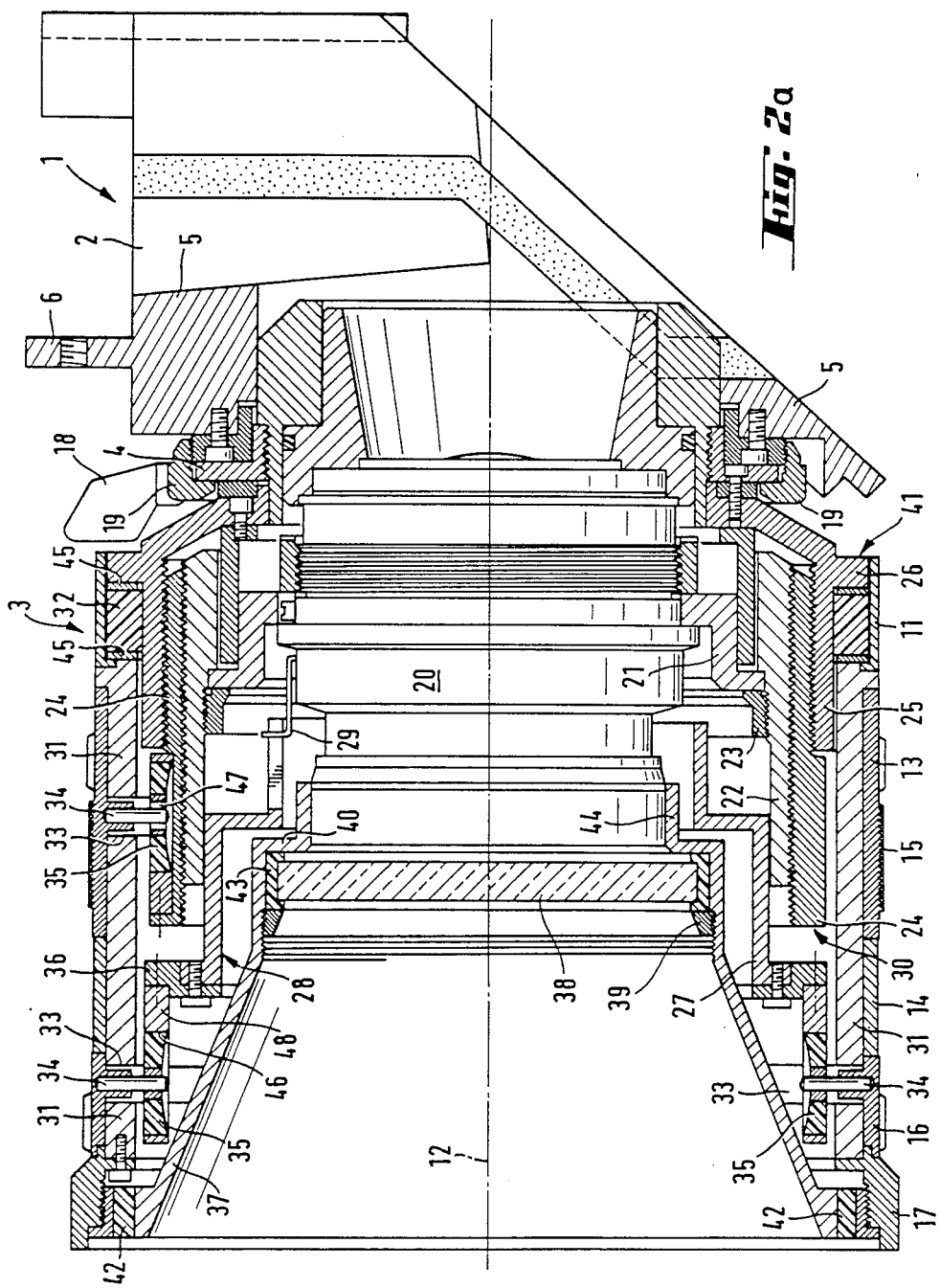
FIG. 2a is a longitudinal section through the interchangeable lens along the lens axis.
Figure 2B:
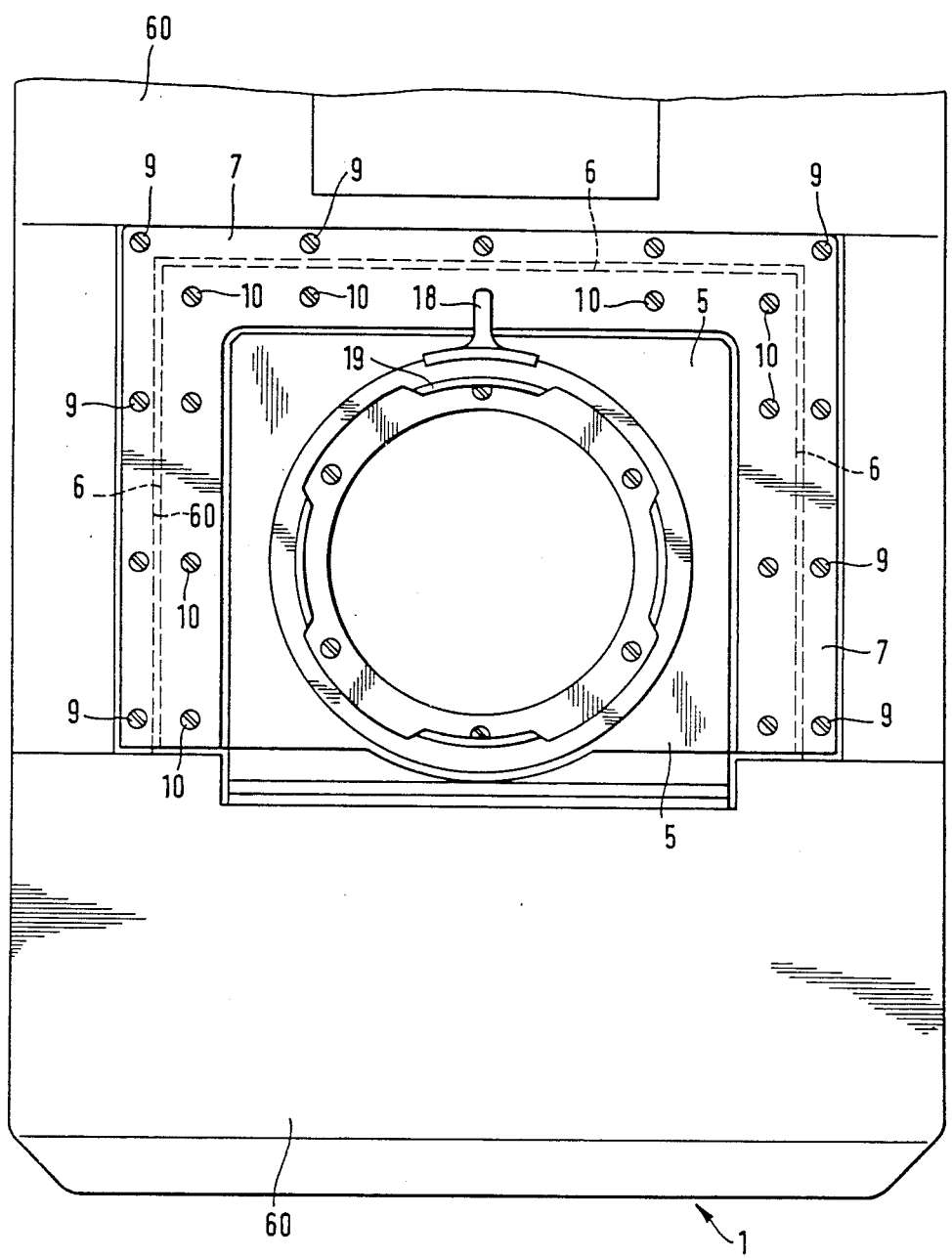
FIG. 2b is a view of the camera case without interchange lens.

As shown in detail in FIG. 2a, the interchangeable lens 3 comprises a lens cluster 20 shown in a front view and the outside mount 41 holding the same—shown in section and to be discussed in detail hereinafter—with diaphragm drive pin and focusing aid, as well as fixing device. the lens cluster 20 is held by a centering ring 21 provided with a thread on its outer and inner surfaces, said centering ring itself being secured in a first threaded ring 22 by means of a retaining ring 23. The thread located on the outer surface of this first threaded ring 22 meshes with another, second, threaded ring 24. The latter threaded ring itself is in contact with a flange 25 via a thread. This second threaded ring 24 forming a focusing aid 30 ensures that, when the threaded ring 24 turns about the axis 12, the lens cluster 20 moves longitudinally, thereby achieving the desired focusing. The flange 25 with radial bar 26 is connected to the bayonet ring 4 on the side of the lens. In the terminal area of the inner, first, threaded ring 22 facing away from the camera case 60, there is provided a diaphragm drivng ring 27, which can move longitudinally to said thread ring 22. This diaphragm driving ring 27 forming a diaphragm driving means 28 contacts a stop setting lever 29 for adjusting a stop (not shown) in the lens cluster 20.

The interchangeable lens 3 is surrounded by a cylindrical sleeve 31 which, in its frontal terminal area on the side of the housing is connected to one side of a damping ring 32 made of elastic structure-borne-sound-absorbing material, especially rubber. The surfaces of the damping ring 32 adjoining the flange 25 are fixedly connected thereto either directly or through metal supports 45 preferably affixed to the ring 32. In this way, the noises caused by the camera drive are damped as much as possible, so that no secondary ambient noises occur for the recording microphone. In this way, the damping ring 32 prevents sound propagagion from the camera movement through the flange 25 to the sleeve 31. The latter has tangentially extending slotted openings 33, through which a radially running drive pin 34 is passed. One of these drive pins 34 is connected with its radial outer end to the focusing scale ring 13 and is arranged with its radial inner end in a platelike damping element 35 of elastic, sound-absorbing material, e.g., rubber. The damping element itself is secured to an appropriate cutout in the second threaded ring 24. The diametrically opposed drive pins 34 are connected to the diaphragm scale ring 26. The radially inner ends of these drive pins 34 are each embedded in another damping element 35 also made of an elastic, sound-absorbing material, e.g., rubber. To transmit the torques acting on the diaphragm scale ring 16, the damping elements 35 are connected by a clamping ring 36 to the diaphragm driving ring 27.

The frontal lens barrel 17 connected to the terminal area on the end face of the cylindrical sleeve (or blimp) 31 is in contact via a thread with an anti-reflection protection system 37 having a frustoconical lateral surface. Into this area of the reflection protection system 37 adjoining the frontal lens barrel 17 there is inserted a radially continuous ring-shaped damping element 42. The anti-reflection protection system 37 has in its tapered area opposite the end of the lens cluster 20 a flat glass plate 38 extending perpendicularly to the axis 12, and by means of another ring-shaped damping element 43, this flat glass plate is inserted into the anti-reflection protection system 37. By means of a retainer ring 39 the flat glass plate 38 is pressed against a gradation 40 of the anti-reflection protection system 37. By use of the damping elements 42, 43 of elastic, sound-absorbing material, e.g., rubber, further noise deadening can be achieved in the camera direction which is to be rated very critically. The anti-reflection protection system 37 has between the flat glass plate 36 and the lens cluster 20 a cylindrical end piece 40, the diameter of which is designed to be slightly larger than the diameter of the adjoining lens cluster 20.

I claim:

1. An interchangeable lens apparatus that can be mounted to a movie camera housing and dampen sound created by a movie camera driving means disposed within said movie camera housing comprising:
   an outer sleeve;
   lens means, disposed within said outer sleeve, for directing light;
   means connected to said lens means for rigidly and releasably securing said lens means to said movie camera housing; and
   sound absorbing damping means disposed between said outer sleeve and said securing means which fully and floatingly support said outer sleeve for keeping sounds produced by said driving means within said outer sleeve.

2. An interchangeable lens apparatus according to claim 1 wherein:
   said lens means includes a lens cluster;
   said securing means includes a flange which holds said lens cluster and one of a bayonet ring and a threaded ring, attached to said flange, that can be rigidly and releasably connected to said movie camera housing; and said damping means includes a damping ring disposed between said flange and one end of said outer sleeve.

3. An interchangeable lens apparatus according to claim 2 further including means for focusing said lens means, said focusing means including:

means attached to said flange for longitudinally moving said lens cluster;

first sound absorbing damping means attached to said moving means for damping said sound produced by said driving means;

a rotatable focusing scale ring disposed over said outer sleeve; and at least one first driving pin connecting said rotatable focussing scale ring and said first damping means so that rotation of said focusing scale ring causes focusing of said lens cluster.

4. An interchangeable lens apparatus according to claim 3 further including:

means for adjusting a stop;

second sound absorbing damping means attached to said stop adjusting means for damping said sound produced by said driving means;

a rotatable diaphragm driving ring disposed over said outer sleeve; and at least one second driving pin connecting said rotatable diaphragm driving ring and said second damping means so that rotation of said rotatable diaphragm driving means causes adjustment of said stop.

5. An interchangeable lens apparatus according to claim 3 further including:

an anti-reflection protection means having a frusto-conical lateral surface attached to said outer sleeve;

a glass palte attached to said anti-reflection protection means;

third sound absorbing damping means disposed between said outer sleeve and said anti-reflection protection means for damping said sound produced by said driving means; and fourth sound absorbing damping means disposed between said anti-reflection protection means and said glass plate for damping said sound produced by said driving means.

* * * * *